UNITED STATES PATENT OFFICE.

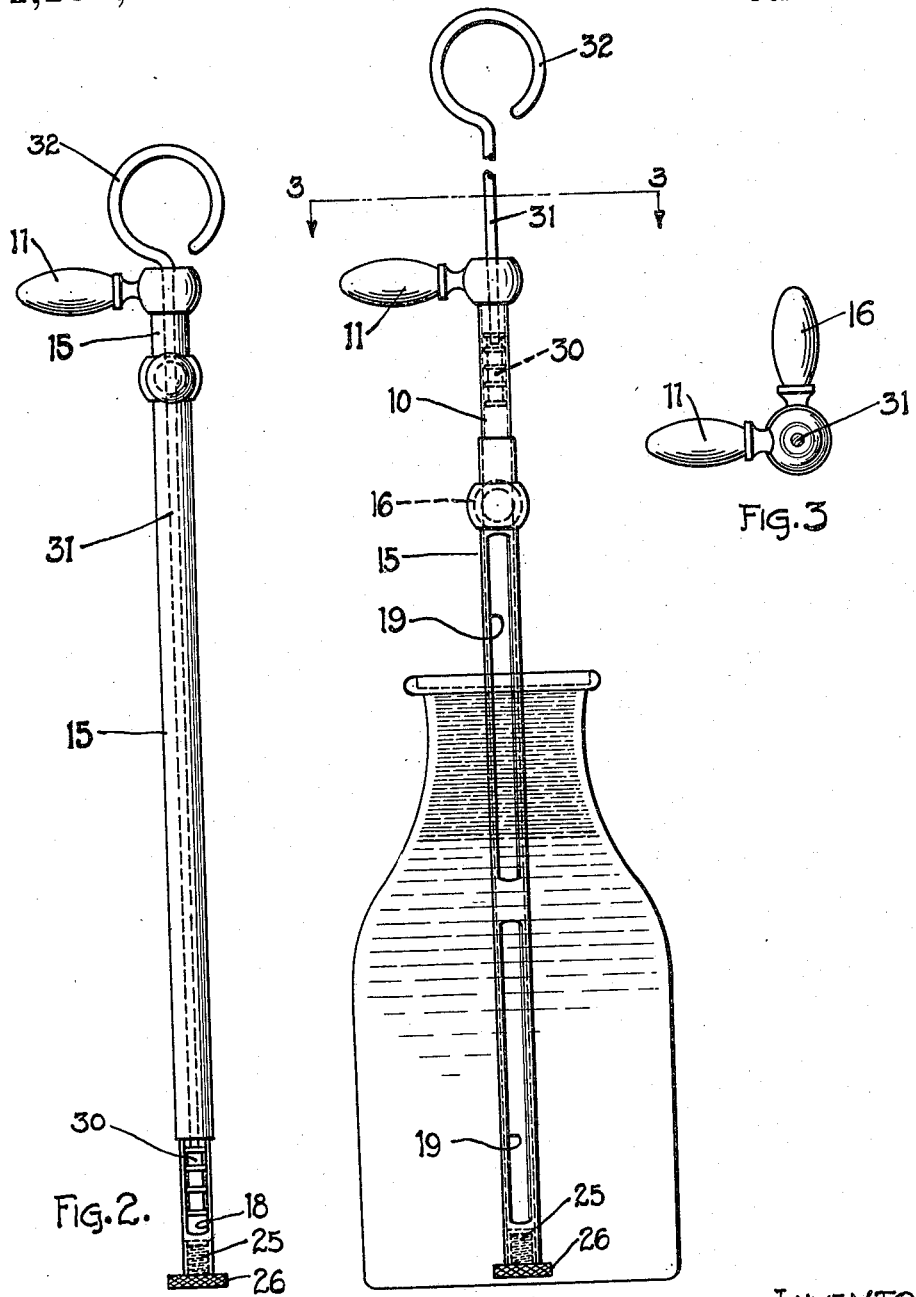

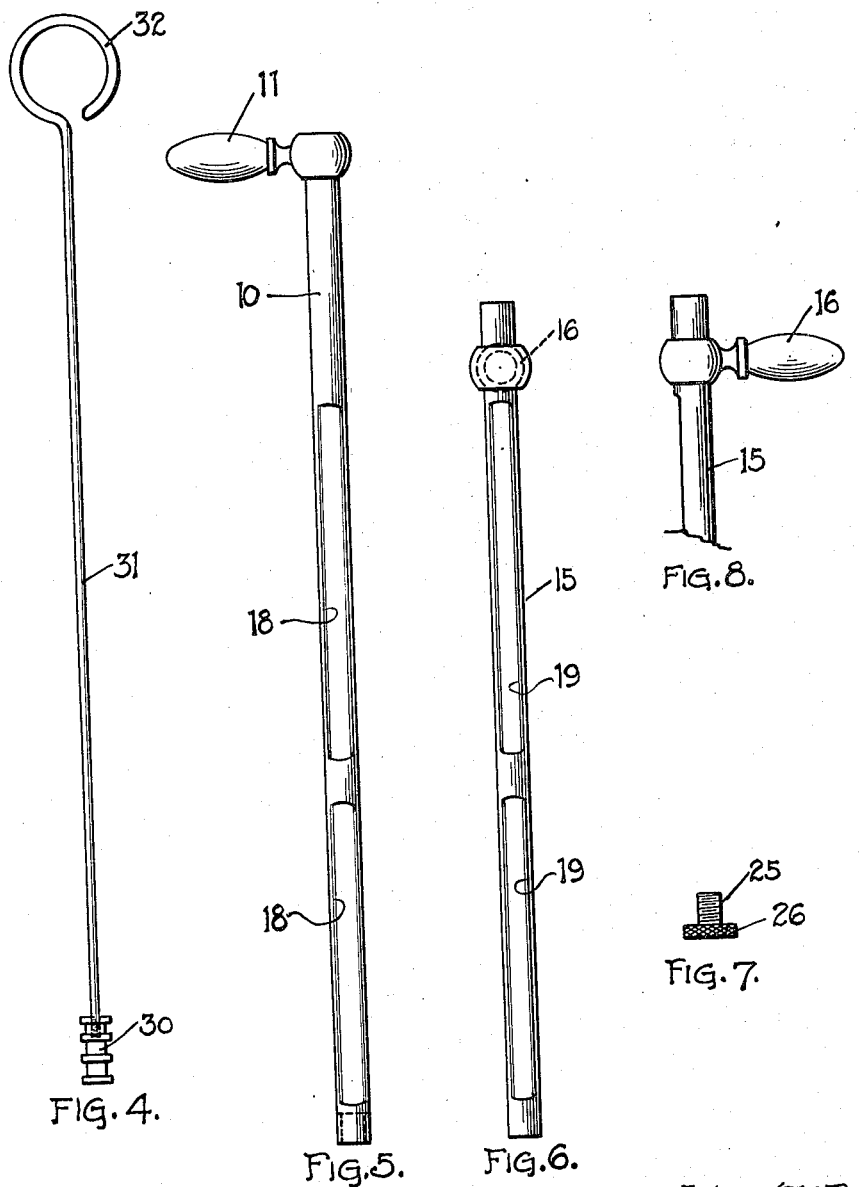

GEORGE L. McKAY, OF EVANSTON, ILLINOIS.

LIQUID-SAMPLING DEVICE.

1,156,240.  Specification of Letters Patent.  Patented Oct. 12, 1915.

Application filed August 10, 1914. Serial No. 856,128.

*To all whom it may concern:*

Be it known that I, GEORGE L. MCKAY, a citizen of the United States, residing at 2016 Sheridan road, in Evanston, county of Cook, and State of Illinois, have invented new and useful Improvements in Liquid-Sampling Devices, of which the following is a specification.

This invention relates to improvements in liquid sampling devices of the kind comprising in general a tube adapted for insertion into a receptacle containing the liquid to be tested in order to withdraw therefrom a small quantity of the liquid; and more especially to means for withdrawing samples from various depths of the liquid, as for example, where milk and cream are tested and it may be desired to note the amount of butter fat in the milk or cream. The device therefore includes two tubes, one telescoping within the other and both having their walls cut away to provide large slots throughout substantially the length of the tubes so that when the two tubes are turned in such position that the slots register and are inserted into the liquid, they may be filled through such slots, and the latter then closed by rotating one of the tubes into a position where the slots are out of registry so that the liquid may be withdrawn. A device including such parts and embodying the principles of the present invention is illustrated in the accompanying drawings in which:

Figure 1 is a view of the complete device showing the manner of its use in the operation of sampling milk contained in a milk bottle. Fig. 2 is a view of the complete device withdrawn from the milk bottle, showing the position of the parts after the milk has been expelled from the device. Fig. 3 is a horizontal section on the line 3--3 of Fig. 1. Fig. 4 is a view in elevation showing the liquid expelling means in the form of a piston and a piston rod comprising a part of the device. Fig. 5 is a similar view showing the smaller tube. Fig. 6 is a similar view showing the larger tube. Fig. 7 is a similar view showing a detachable collar for retaining the two tubes in proper relation to each other. Fig. 8 is a fragmentary view similar to Fig. 6 but showing the larger tube as viewed from a different angle.

As shown in said drawings, the device comprises two telescopic tubes, an inner one 10 having a handle 11 at its upper end, and an outer one 15 fitted over the inner one and likewise provided at its upper end with a handle 16 so that the two tubes may be rotated with respect to each other. Large slots, 18, 18 and 19, 19 respectively, are made through the walls of each tube and extend throughout substantially the entire length of the outer tube 15 and through nearly the entire length of the inner tube 10, which latter tube is made somewhat longer than the other one so that in addition to the rotation of the larger tube upon the smaller one, such larger tube may be slid up and down; and when it is said upward to its highest position, as shown in Fig. 2, part of the slot at the lower end of the smaller tube will be uncovered in all angular positions of the two tubes. The lower end of the tube 10 is internally threaded and engaged by a screw stud 25 having a knurled head 26 which forms a collar to prevent the outer tube from sliding off the inner one and to confine its sliding movement within the distance of the length of the inner tube. Within the inner tube is also fitted a piston 30 with a piston rod 31 having a handle 32 at its upper end.

The operation of the device is as follows: The piston 30 being drawn up to the top of the inner tube, and the outer tube slid downward to the end of its movement, the two tubes are turned into such position that the slots are uncovered and the device inserted into the liquid to be sampled. The slots are then closed by turning one of the tubes with respect to the other and the device withdrawn. The slot in the lower end of the inner tube is then uncovered by sliding the outer tube upward and the contents of the device expelled by pushing the piston 30 downward.

The piston and piston rod may be withdrawn through the upper end of the tube 10 at any time, and by unscrewing the stud 25 the two telescopic tubes may likewise be separated so that thus the entire device may be readily taken apart and all parts exposed for cleaning or otherwise.

I claim as my invention:

1. In a liquid sampling device, two telescopic tubes having slots through their walls, such tubes being adapted for rotation and for endwise sliding movement with respect to each other, means for limiting such sliding movement, and a piston within such inner tube.

2. In a liquid sampling device, two telescopic tubes having slots through their walls, such tubes being adapted for rotation and for endwise sliding movement with respect to each other, a detachable collar on the end of the inner tube, and a piston within such inner tube.

In witness whereof, I have hereunto subscribed my name in the presence of two witnesses this 7th day of August, 1914.

GEO. L. McKAY.

Witnesses:
 HAROLD L. ICKES,
 DRICLA R. RIEVEY.

Copies of this patent may be obtained for five cents each, by addressing the "Commissioner of Patents, Washington, D. C."